T. WHITEHEAD.
APPARATUS FOR SPINNING, DOUBLING, AND TWISTING YARNS OR THREADS OF FIBROUS SUBSTANCES.
APPLICATION FILED FEB. 17, 1919.

1,389,921. Patented Sept. 6, 1921.

Inventor
Thomas Whitehead

UNITED STATES PATENT OFFICE.

THOMAS WHITEHEAD, OF BLACKPOOL, ENGLAND.

APPARATUS FOR SPINNING, DOUBLING, AND TWISTING YARNS OR THREADS OF FIBROUS SUBSTANCES.

1,389,921.  Specification of Letters Patent.  Patented Sept. 6, 1921.

Application filed February 17, 1919. Serial No. 277,559.

*To all whom it may concern:*

Be it known that I, THOMAS WHITEHEAD, a subject of the King of Great Britain, residing at The Roost, 19 Bela Grove, Blackpool, Lancaster, England, have invented certain new and useful Improvements Relating to Apparatus for Spinning, Doubling, and Twisting Yarns or Threads of Fibrous Substances, of which the following is a specification.

This invention relates to spindle apparatus for spinning, doubling, and twisting yarns or threads of fibrous substances wherein a spindle passes through a tube, cylinder or its equivalent (hereinafter referred to as the "carrier") carrying at its upper end a ring and traveler, the said tube and spindle being driven at different speeds by separate wharls from any convenient source of driving power.

The present invention has for its chief object to provide a form of apparatus of this class which will be simple and efficient in construction, will possess and retain perfect flexibility and concentricity and be easily and economically lubricated.

According to this invention the carrier is mounted in a self-alining bearing and constitutes a bearing for the spindle. For this purpose a portion of the carrier is rotatably mounted in a self-alining bearing carried by the carrier rail. Such bearing is open at the top for lubricating purposes and lubricant is conveyed to the spindle through an oil hole in the wall of the carrier. The bearing advantageously comprises a self-alining double row ball bearing, the inner ball race being mounted on a portion of the carrier and the outer ball race being received within a cup or recess in the carrier rail and secured by a set screw, the slackening or removal of which enables the carrier and its bearing to be removed from the rail. The wharl for driving the carrier is preferably mounted below the rail and if desired the upper surface of the latter may be covered by a metal shield to prevent access of fluff or foreign matter to the bearings, suitable apertures being formed where required for lubricating purposes.

In the accompanying drawings:—

Figure 1:
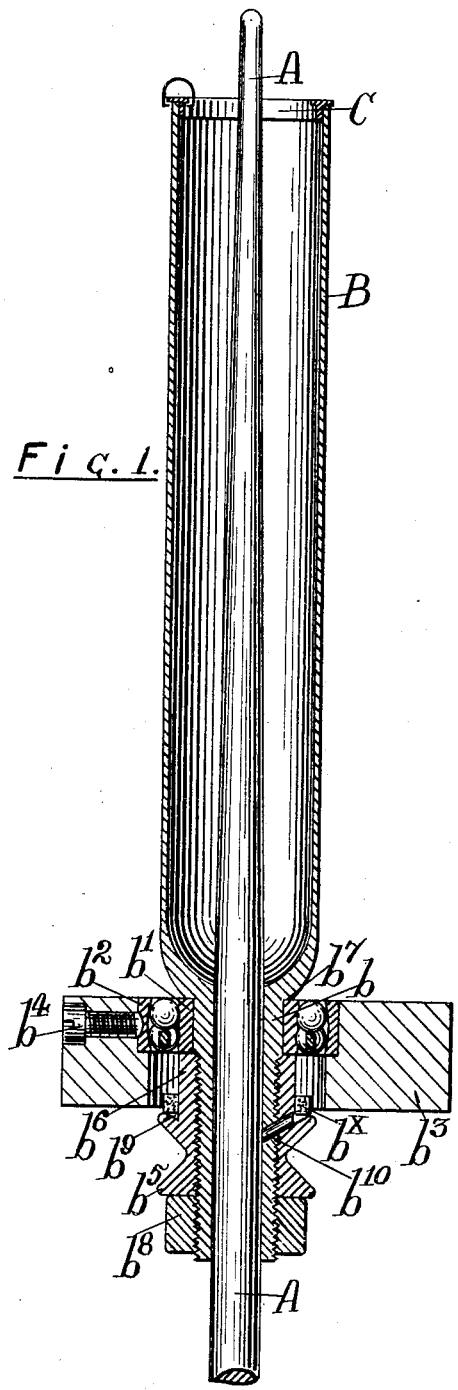
Figure 2:
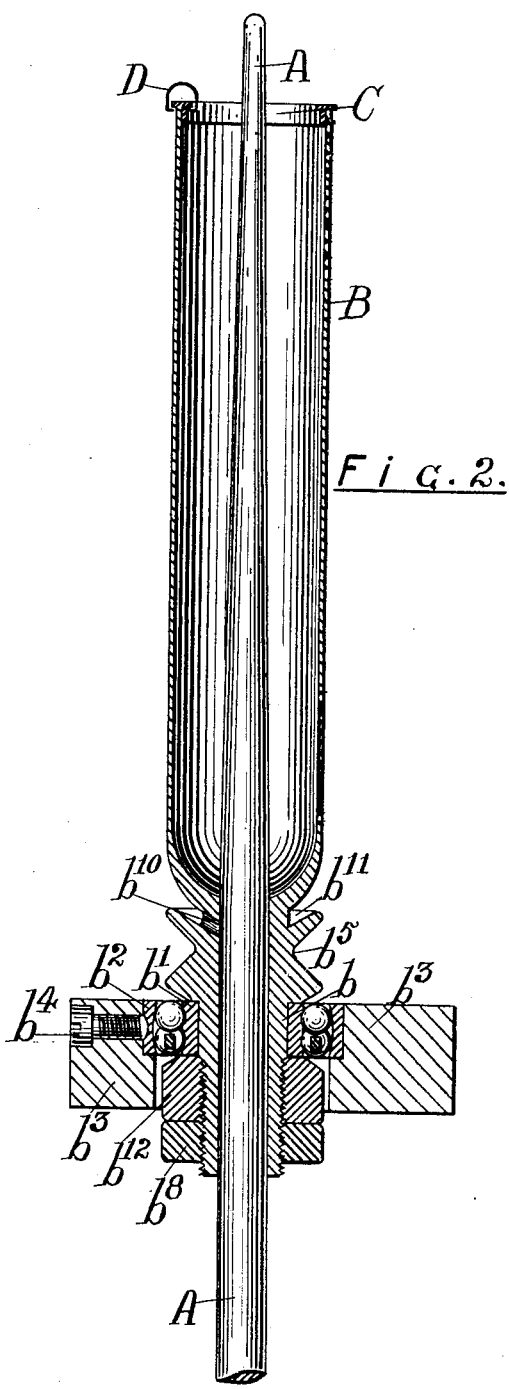

Figure 1 is a vertical section of a form of spindle apparatus constructed in accordance with this invention, and Fig. 2 is a similar view showing a modification.

A indicates the spindle, B the carrier, C the ring and D the traveler.

In the example shown in Fig. 1 the carrier B is formed or provided at its lower end with an extension or sleeve $b$ which constitutes a bearing for the spindle A. This extension or sleeve is arranged to make a self-alining bearing with the carrier rail, and in the example shown for effecting this purpose the upper end of the sleeve is made cylindrical to receive the inner ball race $b^1$ of a self-alining double row ball bearing of which the outer ball race $b^2$ fits in a socket in the carrier rail $b^3$, and is secured by a screw $b^4$. The wharl $b^5$ is screwed onto a threaded portion of the sleeve until an extension $b^6$ bears against the inner ball race $b^1$ and forces the upper surface of the latter against a shoulder $b^7$ on the carrier the wharl being finally secured upon the sleeve by a lock nut $b^8$. In this example the wharl occupies a position between the carrier rail $b^3$ and the footstep bearing for the spindle A. The ball bearing being open at the top is readily lubricated and excess oil from such bearing drops onto a felt or other absorbent washer $b^x$ on the extension $b^6$. This washer lies above the annular recess $b^9$ in the top of the wharl and such annular recess communicates with the spindle by way of a passage $b^{10}$. It will thus be seen that the washer $b^x$ acts as a lubricant container for supplying the spindle and also as a filter for preventing grit or other foreign matter from reaching the spindle by way of the passage $b^{10}$. In the modified construction shown in Fig. 2 the wharl $b^5$ occupies position above the carrier rail $b^3$ and in this arrangement the wharl is conveniently formed in a piece with the carrier. Situated between the wharl and the carrier is an annular groove $b^{11}$ for lubricating purposes and such groove communicates with the spindle by way of the passage $b^{10}$. The inner ball race $b^1$ is retained in position on the sleeve $b$ by a nut $b^{12}$ and lock nut $b^8$. In either arrangement the carrier and bearing can be removed from the carrier rail by slackening or removing the screw $b^4$. If desired the top of the carrier rail may be covered by a sheet metal shield to prevent access of fluff or foreign matter to the ball bearing such shield being provided where necessary with oil caps or other lubricating devices. By constructing the carrier and sleeve in one piece and making the same act as a bearing for the spindle, perfect concentricity of the carrier and spindle is likely to be maintained and by mounting the carrier in a self-alining bearing it follows any deflection of the spindle without producing friction between the carrier and spindle or between the carrier and its bearing. Moreover owing to the carrier being on the spindle, and revolving in the same direction and nearly at the same speed friction between the spindle and the interior of the carrier is practically negligible and as the carrier is driven with a separate band it becomes practically an auxiliary driver for the spindle.

What I claim as my invention and desire to secure by Letters Patent of the United States is:—

1. The combination with a spindle and means for rotating it, of an independently driven ring carrier constituting a bearing for the spindle, and a self adjusting bearing for the carrier.

2. In an apparatus for the purpose described, the combination of a carrier rail having a pocket formed therein, a spindle extending through said pocket, an independently driven ring carrier constituting a bearing for the spindle, and extending through said pocket, and a self adjusting bearing for the carrier within the pocket.

3. In an apparatus for the purpose described, the combination of a carrier rail having a pocket formed in its upper face, a spindle extending through said pocket, a ring carrier extending through said pocket and constituting a bearing for the spindle, a self adjusting bearing for the carrier within said pocket and a wharl mounted on the carrier for rotating it independently of the spindle.

4. In an apparatus for the purpose described, the combination of a carrier rail having a pocket formed therein, a spindle extending through the pocket, an independently driven ring carrier constituting a bearing for the spindle, a self adjusting bearing for the carrier within the pocket, and means for lubricating the spindle through the carrier wall.

5. In spindle apparatus the combination of an independently driven spindle, an independently driven carrier constituting a bearing for the spindle, a carrier rail having a pocket, a self-alining carrier bearing detachably mounted in such pocket, a wharl mounted upon the carrier below the rail, a lubricating passage extending from the spindle to an annular recess on the wharl and an absorbent pad surmounting such recess.

In testimony whereof I affix my signature in presence of two witnesses.

THOMAS WHITEHEAD.

Witnesses:
AMOS HARTLY,
JOSEPH ATKIN JOHNSON.